Nov. 4, 1969 H. B. FARENSBACH 3,476,958
ELECTRIC CIRCUIT EMPLOYING PHASE CONTROL
Filed Oct. 12, 1965 2 Sheets-Sheet 1

INVENTOR.
H. B. FARENSBACH

INVENTOR.
H.B. FARENSBACH 3,476,958

ELECTRIC CIRCUIT EMPLOYING PHASE CONTROL

Harry B. Farensbach, 420 Riverside Drive, New York, N.Y. 10025

Filed Oct. 12, 1965, Ser. No. 495,287
Int. Cl. H03k *3/26, 19/08, 23/22*
U.S. Cl. 307—305 7 Claims

ABSTRACT OF THE DISCLOSURE

An electric circuit for controlling the amount of electric power to a load in accordance with a self-generated control voltage. The circuit is provided with controllable means to shift the phase of the control voltage with respect to that of an applied voltage which has a constant amplitude and frequency whereby the amount of power derived from the applied voltage and delivered to the load varies in accordance with the actual phase shift.

My invention is directed toward electric circuits for controlling the amount of electrical power supplied to a load.

It is an object of my invention to provide a new and improved electric circuit which in response to an applied alternating voltage of constant amplitude and frequency supplies a predetermined amount of electric power to a load in accordance with a self generated control voltage, the circuit having controllable means to shift the phase of the control voltage with respect to that of the applied voltage whereby the amount of power delivered to the load varies in accordance with the actual phase shift.

Another object of my invention is to provide a new and improved circuit of the character indicated utilizing a phase shifting network in conjunction with one or more controlled rectifiers.

Still another object of my invention is to provide a new and improved circuit of the character indicated which can be manufactured easily and inexpensively and yet enables the phase of the control voltage to be shifted with respect to that of the applied voltage over substantially the entire range from 0° to 180° whereby the amount of power delivered to the load can be varied over an extremely wide range.

All of the foregoing and still further objects and advantages of my invention will either be explained or will become apparent hereinafter.

In accordance with the principles of my invention, I provide first, second, third and fourth inductances, the first and second inductances being inductively coupled to each other, the third and fourth inductances being inductively coupled to each other, the third and fourth inductances having means to vary the inductance thereof without varying the induced voltage ratio between the third and fourth inductances. One end of the second inductance is connected to one end of the third inductance; one end of the first inductance is connected to one end of the fourth inductance.

A resistance is connected at one end to one end of said fourth inductance and at the other end to the other end of the first inductance. When an applied alternating voltage of constant amplitude and frequency is impressed across the first inductance, a control voltage of like frequency appears between the other end of said third inductance and the other end of the resistance. The phase of the control voltage with respect to that of the applied voltage is shiftable over substantially the entire range of 0° to 180° depending upon the setting of said means, the phase shift increasing monotonically with increasing inductance value of said fourth inductance.

At least one control rectifier having first and second current electrodes and a control electrode can have its first electrode connected to the other end of the resistance terminal and its control electrode connected to the other end of the third inductance. A suitable load can be connected between the second electrode and the one end of the first inductance.

The controlled rectifier will conduct over a portion of alternate half cycle period of the applied voltage, the duration of each conductive period being determined in accordance with the phase shift between the control voltage and the applied voltage. The average electric power supplied to the load increases with increasing duration of each conductive period. Hence by varying the values of the third and of the fourth inductances, the average power delivered to the load can be varied accordingly.

Illustrative embodiments of my invention will now be explained with reference both to this specification and to the accompanying drawings wherein.

Figure 1:
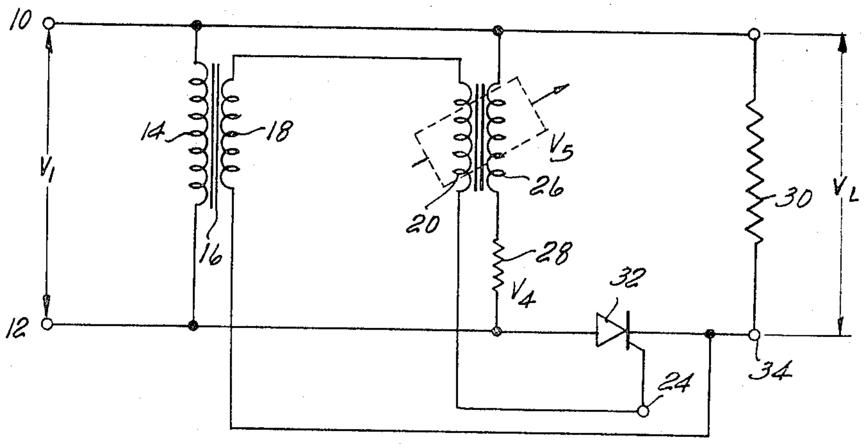
FIG. 1 is a circuit diagram of one form of my invention.

Referring now to FIG. 1, an alternating voltage VI of constant amplitude and frequency is applied between terminals 10 and 12. The primary winding 14 of transformer 16 is connected between terminals 10 and 12. The secondary winding 18 of transformer 16 is connected at one end to terminal 12 and at its other end to one end of primary winding 20 of a second transformer. The other end of primary winding 20 is connected to terminal 24. The secondary winding 26 of said second transformer is connected in series with resistance 28, this series arrangement being connected between terminals 10 and 12. The inductances of windings 20 and 26 are manually variable together in such manner that the ratio of the number of turns of primary winding 20 to secondary winding 26 is not varied. The voltage across winding 18 is designated as V2, that across winding 20 as V3; that across resistance 28 as V4; that across winding 26 as V5; that between terminals 24 and 12 (the control voltage) as V6; and of course the voltage across winding 14 is V1. A load resistor 30 is connected across the series connected winding 26 and resistor 28 between terminals 10 and 12. A silicon controlled rectifier 32 has its control electrode connected to terminal 24, its anode connected to terminal 12 and its cathode connected at terminal 34 (connected in turn through resistor 30 to terminal 10). The voltage across resistor 30 is designated as $V_L$.

Figure 2:
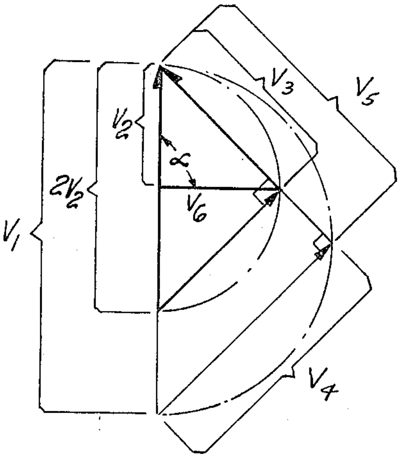
FIG. 2 is a vector diagram explaining the operation of a portion of the circuit of FIG. 1.

The vectorial relationships between voltages V1, V2, V3, V4, V5 and V6 are shown in FIG. 2. Voltage V1 is equal to the vectorial sum of voltages V4 and V5, but voltages V4 and V5 are 90° out of phase with each other. Voltage V2 is proportional to and in phase with voltage V1. Voltage V3 is proportional to and opposed in phase with voltage V5. The phase angle $\alpha$ between voltage V6 (the control voltage) and V2 is the same as between V6 and V1 (the applied voltage). As the inductances of windings 20 and 26 are adjusted to a minimum value approaching zero, voltages V5 and V3 approach zero and the phase angle approaches zero. As the inductances of windings 20 and 26 are adjusted to a maximum value at which V5 is much larger than voltage V4 (since the impedance of the inductances can be much larger than that of resistance 28), the phase angle can approach 180°. For an intermediate value of the inductance, the phase angle also has an intermediate value. The phase angle increases monotonically with increasing inductance values. Note that V1 represents the hypotenuse of a right triangle having V4 and V5 as the legs thereof whereby the point of intersection of V4 and V5, depending upon the value of the inductances of winding 26 and resistor 28 can be moved anywhere along the circumference of a semi-circle having V1 as a diameter. When the ratio of the turns of primary winding 14 to secondary winding 18 is twice the ratio of turns of secondary winding 26 to primary winding 20, the point of intersection of V6 and V3 also depending upon the value of inductances of windings 20 and 26 can be moved anywhere along the circumference of a semicircle having $2\times V2$ as a diameter. In other words, under these conditions, the phase angle varies as above but the amplitude of V6 remains constant. If these ratios differ, the amplitude of V6 as well as its phase angle varies.

The silicon controlled rectifier, providing that the instantaneous voltage V6 at the control electrode is at least equal to +VF, will then conduct over the subsequent positive half cycles of the applied voltage and permit voltage $V_L$ to appear across load resistor 30 in the form of alternate positive half cycles; voltage V1 will disappear on negative half cycles, since the rectifier cannot conduct during these negative half cycles. A voltage can only appear across the load resistor when current flows through the rectifier. More particularly, the rectifier, because of its asymmetric current characteristic, will not conduct during negative half cycles regardless of the value of the control voltage V6; it will not conduct during the positive half cycles as long as voltage V6 remains below +VF; during any positive half cycles, as soon as the control voltage reaches +VF, the rectifier will become conductive and will continue to conduct during the remainder of the positive half cycle regardless of any increase or decrease in voltage V6; the rectifier will be rendered non conductive thereafter only where the current through its anode and cathode reverses direction i.e., on the initiation of the successive negative half cycle.

Figure 3:
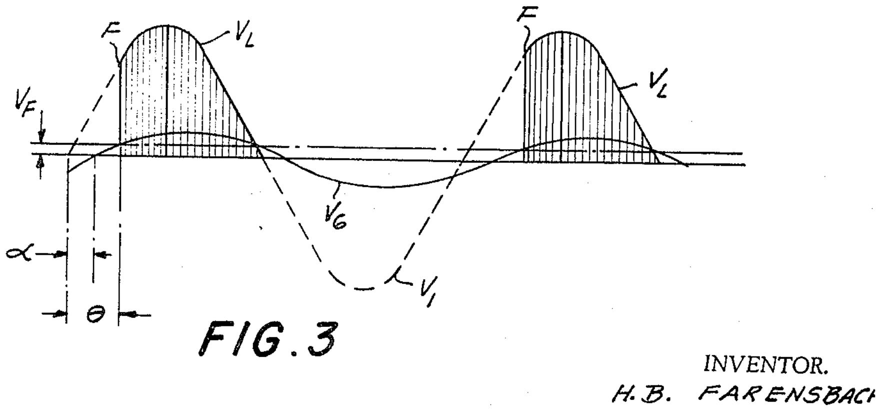
FIG. 3 illustrates certain voltage wave forms of the circuit of FIG. 1.

As can be seen in FIG. 3, as the phase angle $\alpha$ increases, the time $\theta$ required from the instant of the initiation of any positive half cycle to the instant at which control voltage V6 reaches the minimum firing level +FV also increases. As $\theta$ increases, that portion of the period of each positive half cycle in which the rectifier conducts and an output voltage $V_L$, appears across the load inductance (as indicated by shaded portions in FIG. 3) decreases; the net result is that the average electric power consumed by the load resistor varies from a maximum when the phase angle is approximately zero to a minimum of essentially zero when the phase angle is approximately 180°.

Figure 4:
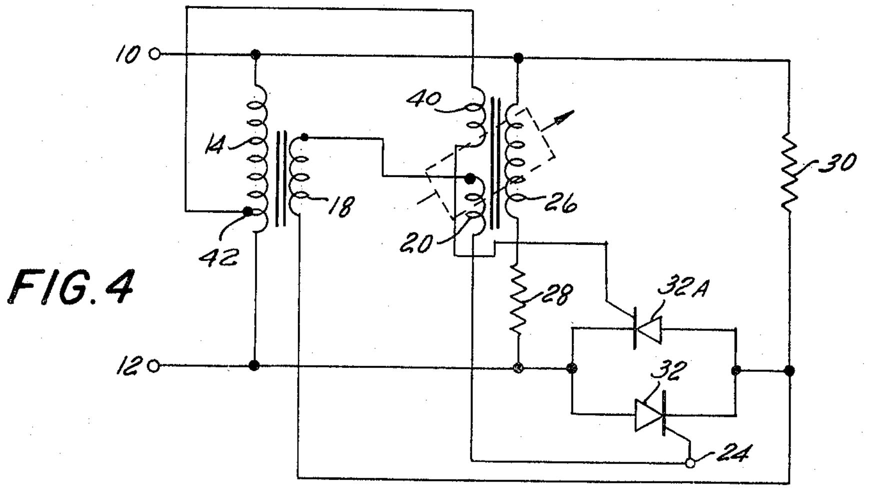
FIG. 4 is a circuit diagram of a modification of the circuit of FIG. 1.

In the circuit of FIG. 4, voltage V6 is developed and applied to the control electrode of rectifier 32 as before. However, rectifier 32A, pole in reverse sense to rectifier 32, is shunted thereacross. The control electrode of rectifier 32A is connected through winding 40 (which is coupled to winding 26) to terminal 10. The upper end of winding 26 is connected to tap 42 on winding 14. The net result is to produce a voltage −V6 as measured between the control electrode of rectifier 32A and terminal 12 which is in phase opposition to, but otherwise identical with, the voltage V6 as measured between the control electrode of rectifier 32 and terminal 12. As a result, rectifier 32A conducts the same portion of each negative half cycle of the applied voltage as rectifier 32 conducts during each positive half cycle, thus doubling the average power delivered to the load as compared to the circuit of FIG. 1 for the same phase angle. The wave forms are shown on FIG. 5.

While the winding connections in FIG. 4 appear somewhat different than FIG. 1, it will be noted that, due to auto transformer action, the portion of winding 14 between terminal 12 and tap 42 is connected to winding 40 in the same manner as winding 18 is connected to winding 20, but of course the phase of the control voltage produced by the portion of winding 14 and winding 40 is opposed to that produced by windings 18 and 20.

Figure 6:
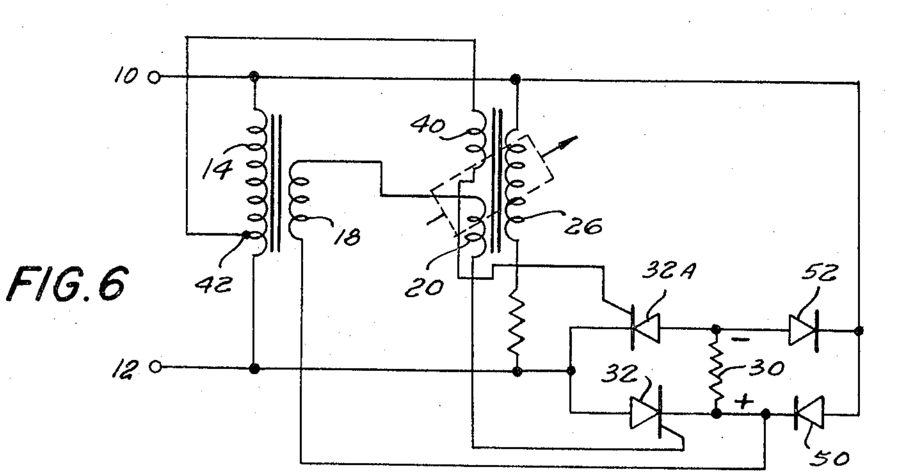
FIG. 6 is a circuit diagram of another modification of the circuit of FIG. 1.
Figure 5:
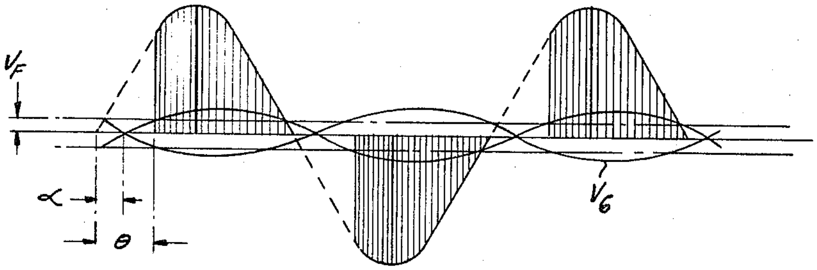
FIG. 5 illustrates certain voltage wave forms of the circuit of FIG. 4.

FIG. 6 shows a modification of the circuit of FIG. 5 in which controlled rectifier 32 is connected in series with conventional rectifier 50 between terminals 12 and 10, to form a first series network. Controlled rectifier 32A is connected in series with conventional rectifier 52 between terminals 12 and 10 to form a second series network. The load resistance is connected between the junction of rectifiers 32A and 52 and the junction of rectifiers 32 and 50.

Note that rectifiers 32 and 50 are opposed in polarity and rectifiers 32A and 52 are opposed in polarity. The control voltages are supplied to the controlled rectifiers as before. The purpose of FIG. 6 is to produce a direct current flow through the load resistor in contradistinction to the alternating current flow through the load resistor as obtained in FIGS. 1 and 4.

If the wave forms of FIG. 5 are modified by inverting the negative half cycles thereof and leaving unaltered the positive half cycles thereof, the resultant modified wave forms will represent the behavior of the circuit of FIG. 6.

It will be obvious to those skilled in the art that while I have shown silicon controlled rectifiers any other type of controlled rectifier such as a Thyratron can be substituted therefor.

What is claimed is:

1. A circuit responsive to an applied alternating voltage of constant frequency and phase to derive therefrom a control voltage of like freqeuncy but shifted in phase with respect to the applied voltage, said circuit comprising:

(a) first, second, third and fourth inductances, the first and second inductances being inductively coupled to each other, the third and fourth inductances being inductively coupled to each other, the third and fourth inductances having means to vary the inductance thereof without varying the induced voltage ratio between the third and fourth inductances, one end of the second inductance being connected to one end of the third inductance, one end of the first inductance being connected to one end of the fourth inductance;

(b) a resistance connected at one end to the other end of said fourth inductance and connected at the other end to the other end of the first inductance; and (c) means to impress said applied voltage across said first inductance to produce said control voltage between the other ends of said second and third inductances, the phase of the control voltage with respect to that of the applied voltage being shiftable over substantially the entire range of 0° to 180° depending upon the setting of said means, the phase shift increasing monotonically with increasing inductance value of said third and fourth inductances.

2. A circuit as set forth in claim 1 further including a fifth inductance, a sixth inductance inductively coupled to the fourth inductance, one end of the fifth inductance being coupled to one end of the sixth inductance whereby another control voltage opposed in phase but otherwise identical to the said control voltage appears between the opposite ends of the fifth and sixth inductances.

3. A circuit as set forth in claim 2 wherein at least two inductively coupled windings constitute an autotransformer.

4. A circuit responsive to an applied alternating voltage of constant frequency and phase and adapted to deliver a variable amount of electric energy derived from said voltage to a load, said circuit comprising:

(a) first, second, third and fourth inductances, the first and second inductances being inductively coupled to each other, the third and fourth inductances being inductively coupled to each other, the third and fourth inductances having means to manually vary the inductance thereof without varying the induced voltage ratio between the third and fourth inductances, one end of the second inductance being connected to one end of the third inductance, one end of the first inductance being connected to one end of the fourth inductance;

(b) a resistance connected at one end to one end of said fourth inductance and at the other end to the other end of said first inductance; and (c) a controlled rectifier having first and second current electrodes and a control electrode, one of the current electrodes being coupled to said other end of said resistance, the other of the current electrodes being coupled to the other end of one of the second and third inductances, the control electrode being coupled to the other end of the other of the second and third inductances, said rectifier being adapted for conduction over a variable portion of alternate half cycles of said applied voltage, the energy supplied to said load increasing monotonically with increasing length of said conduction portion, the length of said portion being determined by the setting of said means.

5. A circuit as set forth in claim 4 further including a second controlled rectifier shunted across the said rectifier and poled in opposite sense.

6. A circuit as set forth in claim 5 further including a first series network including said rectifier and a second series network including said second rectifier, said networks being connected in parallel.

7. A circuit responsive to an applied alternating voltage of constant frequency and adapted to deliver a variable amount of electric current derived from said voltage to a load, said circuit comprising:

(a) first, second, third, fourth, fifth and sixth inductances, the first, second and fifth inductances being inductively coupled to each other, the third, fourth and sixth inductances being inductively coupled to each other, the third, fourth and sixth inductances having means to manually vary the inductance thereof without varying the various induced voltage ratios therebetween, one end of the second inductance being connected to one end of the third inductance, one end of the first inductance being connected to one end of the fourth inductance, one end of the fifth inductance being connected to one end of the sixth inductance;

(b) a resistance connected at one end to one end of said fourth industance and at the other end to the other end of the first inductance; and (c) first and second controlled rectifiers, each rectifier having first and second current electrodes and a control electrode, the first electrode of the first rectifier and the second electrode of the second rectifier being coupled to the other end of the resistance, the second and control electrodes of the first rectifier being connected between the other ends of the second and third inductances, the first and control electrodes of the second rectifier being connected between the other ends of the fifth and sixth inductances.

References Cited

UNITED STATES PATENTS

| | | | |
|---|---|---|---|
| 2,731,594 | 1/1956 | Rockafellow | 328—155 XR |
| 3,142,781 | 7/1964 | Izenour | 323—22 |
| 3,269,933 | 8/1966 | Mahoney et al. | 323—22 XR |

DONALD D. FORRER, Primary Examiner

STANLEY T. KRAWCZEWICZ, Assistant Examiner

U.S. Cl. X.R.

307—297, 314; 315—194; 323—22, 109, 126; 328—155